(12) United States Patent
Vandaele

(10) Patent No.: US 8,252,240 B2
(45) Date of Patent: Aug. 28, 2012

(54) MULTIPLE LOOP REACTOR FOR OLEFIN POLYMERIZATION

(75) Inventor: Hugo Vandaele, Sint-Andries (BE)

(73) Assignee: Total Petrochemicals Research Feluy, Seneffe (Feluy) (BE)

(*) Notice: Subject to any disclaimer, the term of this patent is extended or adjusted under 35 U.S.C. 154(b) by 0 days.

(21) Appl. No.: 13/331,855

(22) Filed: Dec. 20, 2011

(65) Prior Publication Data
US 2012/0093693 A1    Apr. 19, 2012

Related U.S. Application Data

(63) Continuation of application No. 11/498,336, filed on Aug. 1, 2006, now abandoned, which is a continuation-in-part of application No. PCT/EP2005/050626, filed on Feb. 13, 2005.

(30) Foreign Application Priority Data

Feb. 13, 2004  (EP) .................................. 041100583

(51) Int. Cl.
   *B01J 19/18*  (2006.01)
   *C08F 2/00*   (2006.01)

(52) U.S. Cl. .............................. 422/132; 526/65; 526/64
(58) Field of Classification Search .................. 422/132; 526/64, 65
See application file for complete search history.

(56) References Cited

U.S. PATENT DOCUMENTS

| 6,221,982 | B1  | 4/2001 | Debras et al. |
| 6,355,741 | B1* | 3/2002 | Marechal ........................ 526/64 |
| 2002/0061264 | A1 | 5/2002 | Govoni et al. |

* cited by examiner

*Primary Examiner* — William Cheung

(57) ABSTRACT

The present invention provides a multiple loop reactor suitable for polymerizing olefins comprising at least two interconnected loop reactors, whereby said connection essentially consists of one or more transfer lines suitable for transferring polymer slurry from a reactor to another reactor and whereby said transfer line extends substantially horizontally. The invention further relates to a process for producing olefin polymers in a multiple loop reactor according to the invention. The invention also relates to the use of a transfer line for transferring polymer slurry from a reactor to another reactor in a multiple loop reactor comprising at least two interconnected loop reactors, whereby said transfer line extends substantially horizontally.

9 Claims, 3 Drawing Sheets

US 8,252,240 B2

MULTIPLE LOOP REACTOR FOR OLEFIN POLYMERIZATION

CROSS-REFERENCE TO RELATED APPLICATIONS

Figure 1:
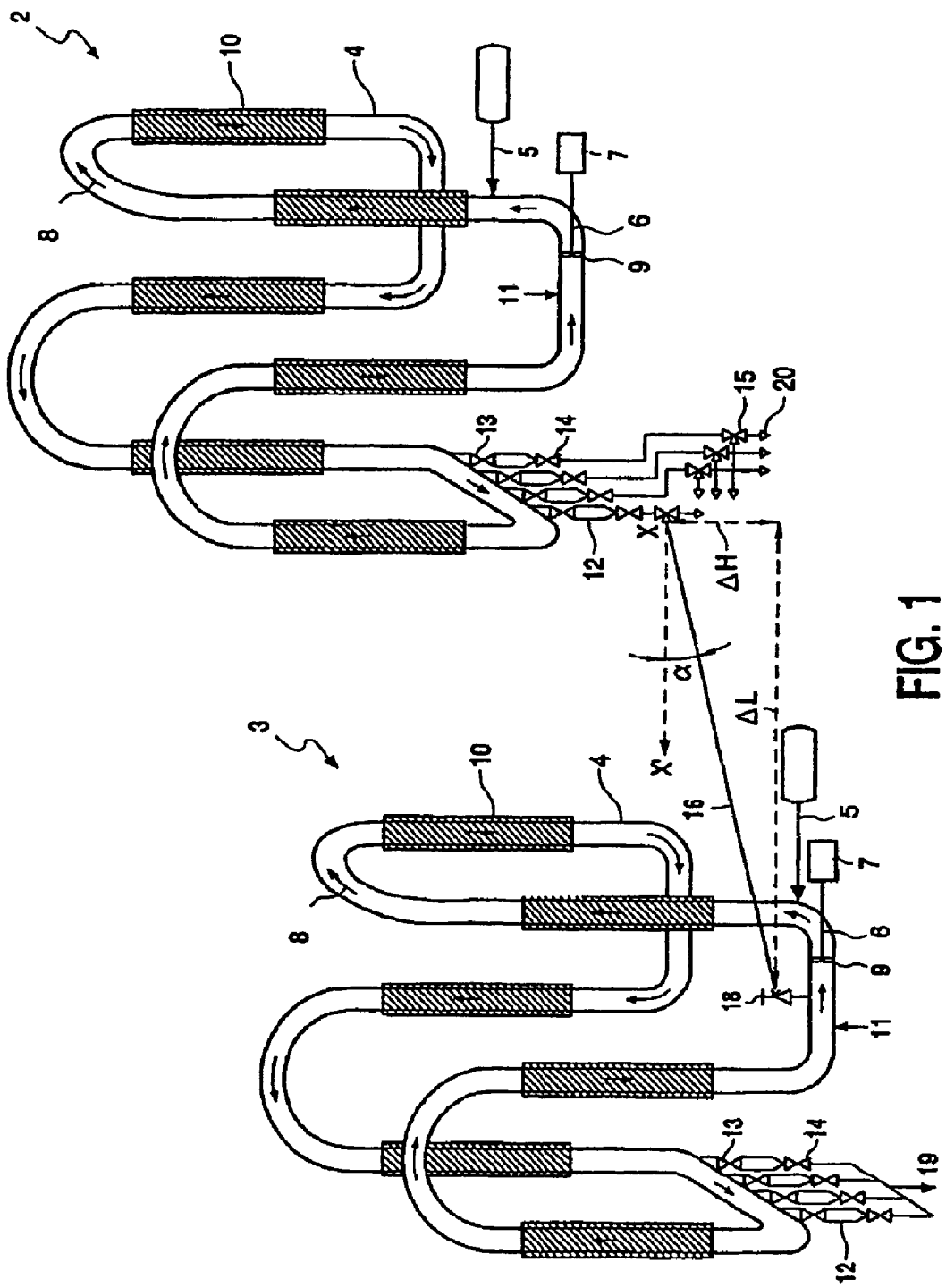

This application is a continuation of Ser. No. 11/498,336, filed Aug. 1, 2006, now abandoned which is a continuation-in-part of PCT/EP2005/050626, filed Feb. 13, 2005, which claims priority from EP 041100583.6, filed Feb. 13, 2004.

FIELD OF THE INVENTION

The present invention relates to improvements in the transfer of polymer slurry from one olefin polymerization loop reactor to another olefin polymerization loop reactor in a multiple loop reactor. More in particular, the present invention relates to a multiple loop reactor suitable for olefin polymerization comprising at least two interconnected loop reactors and to a olefin polymerization process wherein polymer slurry is substantially horizontally transferred from one loop reactor to another loop reactor through transfer lines.

BACKGROUND

Olefin polymerizations such as ethylene polymerization are frequently carried out using monomer, diluent and catalyst and optionally co-monomers and hydrogen in a reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product Settling in the legs is used to increase the solids concentration of the slurry finally recovered as product slurry. The product is further discharged to a flash tank, through flash fines, where most of the diluent and unreacted monomers are flashed off and recycled. The polymer particles are dried, additives can be added and finally the polymer is extruded and pelletized.

Multiple polyolefin reactors operating in series can be used for olefin polymerizations, as is known in the prior art. Certain polymerization processes comprise the use of two or several polymerization reactors, which are interconnected. A "bimodal olefin polymer" refers to an olefin polymer that is manufactured using two reactors, which are connected to each other in series. However, problems associated with known polymerization processes and apparatuses using a polymerization system having two or more serially disposed polymerization reactor vessels, include inaccurate inter-reactor transfer of polymer slurry between the serially disposed reactors, while maintaining each reactor at independently selected operating conditions. In certain cases, fewer fine particles (fines) are produced during transfer, which tend to hang-up or become trapped in transfer equipment and can even plug fines and valves. Frequent plugging causes system down time, lost final product and raw materials, and increased operating costs.

In the prior art systems, interconnected reactors have been described which are disposed in substantially vertical arrangements, i.e. reactors arranged in tandem vertical arrangement under an angle of inclination with respect to a horizontal axis extending from the exit of the first reactor which is more than 45°. Such arrangements require vertical product transfer lines or other vertical means for transferring polymer product from the polymerization zone of a first reactor to the polymerization zone of a second reactor. However, a problem associated with this type of configuration is that it requires the positioning of the reactors in a vertical arrangement, which is generally technically limited and results in increased fabrication costs. Also in such configurations the reactors are positioned dose to one another, which limits their accessibility.

U.S. Pat. No. 3,345,431 describes an apparatus for the co-polymerization of mono-1-olefins. The apparatus comprises two interconnected reactors. Transfer of polymer product from the first reactor to the second reactor is done by transfer of the polymer product into an auger conveyor which carries the polymer products from the first reactor to the wash column of the second reactor. An auger conveyor is a conveyor that has a trough or a tube in which a product moves under the action of an endless screw or flights. Thus, for transfer of the polymer product from one reactor to the other reactor a mechanical, motor-driven, device is used in the apparatus described in U.S. Pat. No. 3,345,431.

In view of the above, there remains a need in the art to provide a method and a polymerization reactor system in which operating problems experienced by prior art multi-reactor systems are reduced and in which the apparatus may be built and operated more economically than prior art systems.

It is therefore a general object of the present invention to provide multiple, interconnected reactors that are built and operated more economically than known prior art multiple reactors. Another object of the invention is to provide an improved method for production of polyolefins in general, and polyethylene in particular, in multiple interconnected reactors. A further object of the present invention is to provide an improved method utilizing multiple, interconnected reactors, which reduces construction and operating costs, and improves operating performance and operating versatility of the reactor system.

SUMMARY

The present invention relates in a first aspect to a reactor suitable for olefin polymerization comprising at least two interconnected reactors, whereby said connection essentially consists of one or more transfer lines suitable for transferring polymer slurry from a reactor to another reactor and whereby said transfer line extends substantially horizontally.

According to the present invention at least two reactors are interconnected, and preferably connected in series, so that polymer product produced in one reactor can be transfer red to another polymerization reactor for further polymerization therein. In accordance with the present invention, the two reactors are disposed in a substantially same horizontal plane permitting direct substantially horizontal transfer of the polymer product from one to the other polymerization reactor. For this purpose, product transfer lines are provided for transferring polymer product from one reactor to another reactor that extend substantially horizontally.

In a preferred embodiment, the transfer line extends substantially horizontally from the exit of a settling leg of a reactor to the entry in another reactor. The transfer line thus connects the exit of a setting leg of a reactor with the entry of another reactor.

In another preferred embodiment, the transfer line extends substantially horizontally under an angle of inclination α with respect to a horizontal axis X-X' which is lower than 45°, and preferably lower than 40°, lower than 35°, lower than 30°, lower than 25°, lower than 20°, and more preferably lower than 15°. In a more preferred embodiment, the transfer line extends substantially horizontally under an angle of inclination α with respect to a horizontal axis X-X' which comprises 0°, 1°, 2°, 3°, 4°, 5°, 6°, 7°, 8°, 9° or 10°.

As used herein the term transfer lines extending "substantially horizontally" refers to the positioning of these lines with respect to a horizontal axis X-X', which differs from this axis X-X' with no more than 45°, and preferably with no more than 40°, preferably with no more than 35°, preferably with no more than 30°, preferably with no more than 25°, preferably with no more than 20°, more preferably with no more than 15°, and most preferably which differs from this axis X-X' with 0°, 1°, 2°, 3°, 4°, 5°, 6°, 7°, 8°, 9° or 10°.

The term a "substantially horizontal plane", as used herein refers to a plane that can be inclined with respect to a horizontal plane with no more than 45°, and preferably with no more than 40°, preferably with no more than 35°, preferably with no more than 30°, preferably with no more than 25°, preferably with no more than 20°, more preferably with no more than 15°, and most preferably comprising 0°, 1°, 2°, 3°, 4°, 5°, 6°, 7°, 8°, 9° or 10°.

The term "substantially horizontal transfer" refers to the transfer of polymer slurry from one reactor to another whereby the transfer is performed by means of a line which has an angle of inclination with respect to a horizontal axis X-X' which is lower than 45°, preferably tower than 40°, preferably lower than 35°, preferably lower than 30°, preferably lower than 25°, preferably tower than 20°, more preferably lower than 15°, and most preferably which comprises 0°, 1°, 2°, 3°, 4°, 5°, 6°, 7°, 8°, 9° or 10°.

The "angle of inclination" as used herein is defined as the angle made by the transfer line with respect to a horizontal axis X-X'. This angle of inclination is according to the invention lower than 45°, preferably lower than 40°, preferably lower than 35°, preferably lower than 30°, preferably lower than 25°, preferably lower than 20°, more preferably lower than 15°, and most preferably comprises 0°, 1°, 2°, 3°, 4°, 5°, 6°, 7°, 8°, 9° or 10°.

In another aspect, the present invention relates to a process for producing olefin polymers in a reactor, wherein said reactor consists of at least two interconnected reactors, whereby said connection essentially consists of one or more transfer fines suitable for transferring polymer slurry from a reactor to another reactor, comprising the steps of

- introducing into a reactor one or more olefin reactants, polymerization catalysts and diluents,
- polymerizing said one or more olefin reactants to produce polymer slurry,
- pumping said polymer slurry for maintaining the circulation In said reactor,
- said process further comprising one or more cycles of
- allowing said polymer slurry to settle in one or more settling legs connected to said reactor, and
- substantially horizontally transferring said polymer slurry from said settling legs to another reactor through said one or more transfer lines.

In a preferred embodiment the polymer slurry is transferred substantially horizontally through said transfer line from the exit of a settling leg of a reactor to the entry in the other reactor through a transfer line under an angle of inclination α with respect to a horizontal axis X-X' which is lower than 45° and which most preferably comprises 0°, 1°, 2°, 3°, 4°, 5°, 6°, 7°, 8°, 9° or 10°.

The present invention further relates to the use of a transfer line for transferring polymer slurry from a reactor to another reactor in a reactor comprising at least two interconnected reactors, whereby said transfer line extends substantially horizontally.

In a preferred embodiment the invention relates to the use of a transfer line which extends substantially horizontally from the exit of a settling leg of a reactor to the entry in the other reactor under an angle of inclination α with respect to a horizontal axis X-X' which is lower than 45° and which preferably comprises 0°, 1°, 2°, 3°, 4°, 5°, 6°, 7°, 8°, 9° or 10°.

The reactor and process according to the present invention present several advantages over the prior art, such as allowing optimized transfer of a settled slurry from settling legs from one to another reactor in a cost-effective way.

By providing transfer lines which extend substantially horizontally between the interconnected reactor, two reactors can be positioned in a substantially same horizontal plane, which has the advantage that the installation of the reactors is easier the reactors can be positioned at a greater distance from one another than is the case for vertically aligned reactors. In addition, horizontal alignment of the reactors permits to reduce construction and operating costs and improves the accessibility of each individual reactor, which is important from technical and safety point of view.

Surprisingly, it was shown that substantially horizontal transfer of polymer product from one to another reactor by means of the transfer lines does not increase the frequency of plugging in the polymer transfer lines but provides optimal product transfer in a cost-effective way.

The present invention will be further disclosed in detail hereunder. The description is only given by way of example and does not limit the invention. The reference numbers relate to the hereto-annexed figures.

DETAILED DESCRIPTION OF THE FIGURES

FIG. 1 is a diagrammatic illustration of two polymerization reactors 2, 3, which are connected in series in accordance with the present invention.

Figure 2:
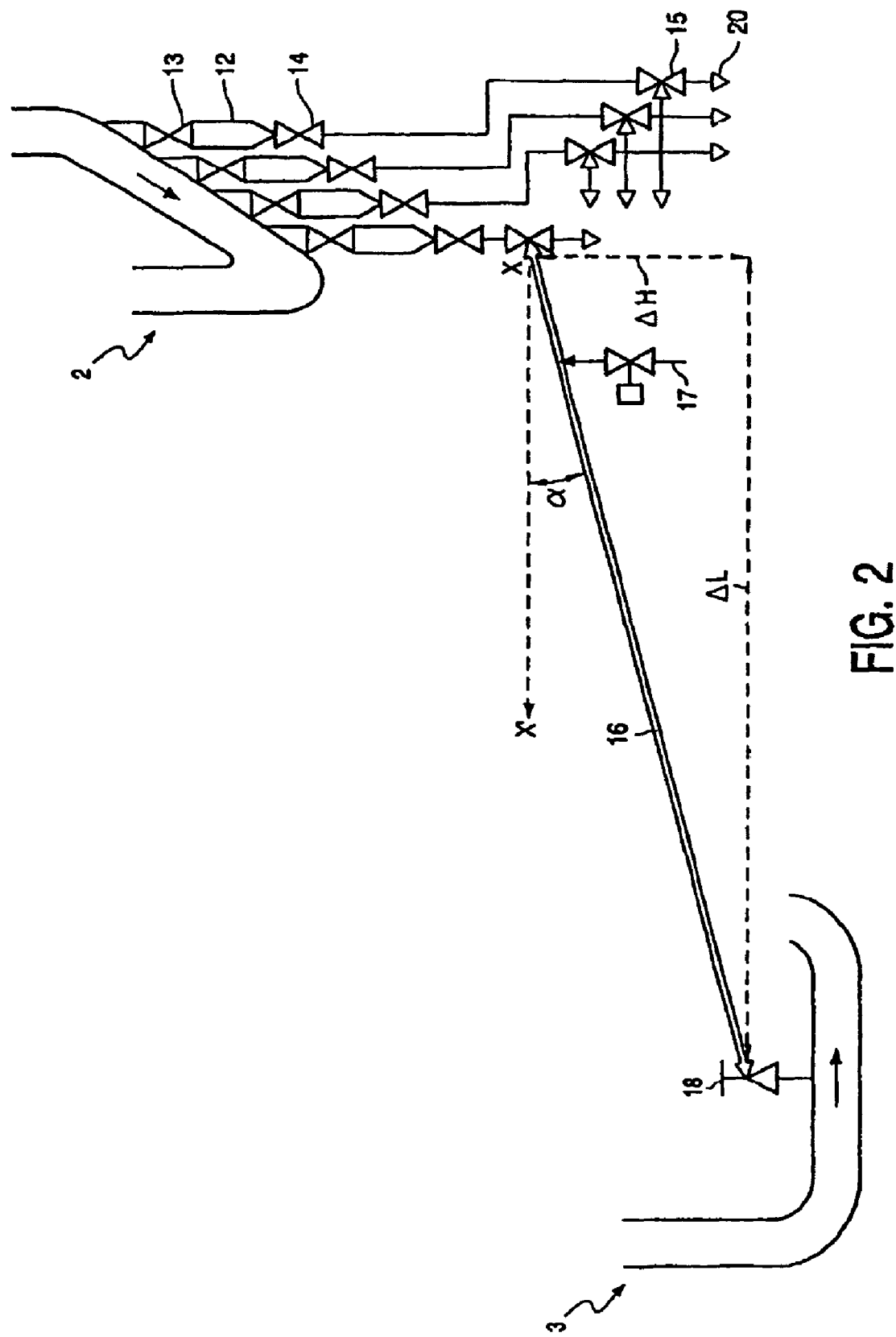

FIG. 2 is a schematic detailed representation of the connection of one loop reactor 2 to another loop reactor 3 by means of transfer lines 16.

Figure 3:
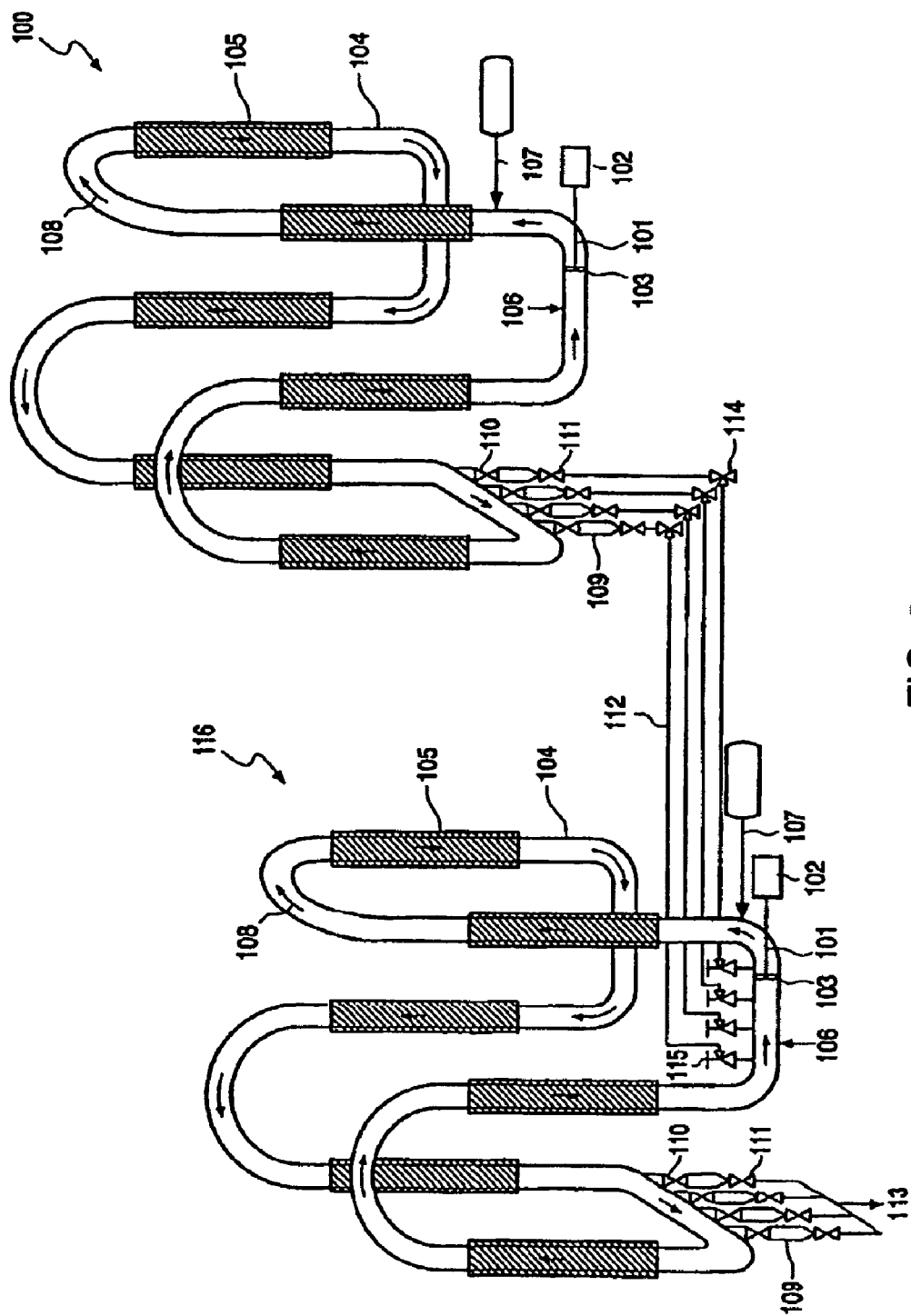

FIG. 3 is a schematic representation of a double loop polymerization reactor.

DETAILED DESCRIPTION OF THE INVENTION

The present invention relates to an apparatus and a process which provide a substantially horizontally transfer of polymer slurry from one to the other reactor in a multiple reactor system.

The following detailed description has been focused on a multiple loop reactor, consisting of at least two loop reactors which are interconnected in series. However, the present invention is not restricted to loop reactors but is also suitable for any other type of multiple reactor, consisting of at least two reactors which are connected in series.

The present invention is suitable for polymerization processes occurring in loop reactors for the production of olefin polymers consisting of the catalytic polymerization of olefins such as $C_2$ to $C_8$ olefins in a diluent containing the monomer to be polymerized. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bars, preferably at pressure of from 30 to 50 bars, more preferably at pressure of 37 to 45 bars.

The present invention has in particular been described in terms of the polymerization of ethylene. Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. More in particular, the present invention is described in terms of the polymerization of ethylene for manufacturing bimodal polyethylene (PE). "Bimodal PE" refers to PE that is manufactured using two reactors, which are connected to each other in series.

Ethylene polymerizes in a liquid diluent in the presence of a catalyst, optionally a co-catalyst, optionally a co-monomer, optionally hydrogen and optionally other additives, thereby producing polymerization slurry.

As used herein, the term "polymerization slurry" or "polymer slurry" or "slurry" means substantially a multi-phase composition including at least polymer solid s and a liquid phase and allows for a third phase (gas) to be at least locally present in the process, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include hydrocarbons that are inert or at least essentially inert and liquid under reaction conditions. Suitable hydrocarbons include isobutane, n-butane, propane, n-pentane, i-pentane, neopentane, isohexane and n-hexane, with isobutane being preferred.

Suitable catalysts are well known in the art. Examples of suitable catalysts include but are not limited to chromium oxide such as those supported on silica or aluminium, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

In a first embodiment, the present invention relates to a multiple loop reactor suitable for olefin polymerization comprising at least two interconnected loop reactors whereby said connection essentially consists of one or more transfer lines suitable for transferring polymer slurry from a reactor to another reactor and whereby said transfer line extends substantially horizontally. Referring now to FIG. 1, a multiple loop reactor 1 is illustrated comprising at least two polymerization reactors 2, 3, which are interconnected in series in accordance with the present invention. Although, in a preferred embodiment, the invention comprises the use of two separate loop reactors, it will be appreciated by those skilled in the art that the invention also may be practiced using more than two separate reactors.

The two reactors 2, 3 may be operated in series to produce, simultaneously, the same or two different polyolefin products, depending upon the polyolefin feed stock and catalyst provided and the temperature, pressure and other conditions maintained inside the reactors. In the preferred embodiment of the apparatus and method of present invention, the reactors are operated in series so that polymer product produced in one reactor is transferred to another reactor for further polymerization therein.

The final polyolefin product produced by the multiple loop reactor is dependent upon a wide range of variables which may be separately adjusted in at least two loop reactor systems, including compositions of the fluidizing mediums in each loop reactor, the polymerization catalysts, the temperatures, pressures, flow rates and other factors maintained in the different reactor. Thus, polymerization system of the present invention using the present multiple loop reactor 1 has the operating flexibility to produce a broad spectrum of polyolefin polymers with varying physical properties. In a preferred embodiment, loop reactors of the multiple loop reactor system are used in series to produce a sequentially polymerized product containing specific characteristics.

As illustrated on FIG. 1, the multiple loop reactor comprises at least two interconnected loop reactors 2,3, each consisting of a plurality of interconnected pipes 4 defining a flow path 8 for a polymer slurry. In addition, one or more se thing legs 12 connected to the pipes 4 of one reactor 2, are provided. Each of these settling legs 12 is provided with a transfer line 16 for transferring polymer slurry to another reactor 3. One or more settling legs 12 are also connected to the pipes 4 of the other reactor 3 for discharging polymer slurry from the reactor 3 into a product recovery zone. Furthermore, at least one pump 6 suitable for maintaining the polymer slurry in circulation in said multiple loop reactor is provided. The connection of the loop reactors 2, 3 essentially consists of one or more transfer lines 16 and whereby said transfer line extends substantially horizontally from one reactor 2 to the other reactor 3. In particular, the transfer line extends substantially horizontally under an angle of inclination α, with respect to a horizontal axis X-X' which is lower than 45°.

Each loop reactor 2, 3 consists of a plurality of interconnected pipes 4, such as a plurality of vertical pipe segments, a plurality of upper lateral pipe segments, a plurality of lower lateral pipe segments, wherein each of said vertical pipe segment is connected at an upper end thereof to one of said upper lateral pipe segment and is connected at a lower end thereof to one of said lower lateral pipe segments through elbow shaped connecting segments, thus, defining a continuous flow path 8 for a polymer slurry. It will be understood that while the loop reactor 2 and 3 are illustrated with four vertical pipes, said loop reactors 2,3 may be equipped with less or more pipes, such as 4 or more pipes, for example between 4 and 20 vertical pipes. The vertical sections of the pipe segments are preferably provided with heat jackets 10. Polymerization heat can be extracted by means of cooling water circulating in these jackets of the reactor. Said reactors preferably operate in a liquid full mode.

The reactants including monomer ethylene, a light hydrocarbon diluent and optionally a co-monomer and hydrogen are introduced into the reactor 2 by line 5. At least one reactor 2 is also fed with catalyst, optionally in conjunction with a co-catalyst or activation agent, by means of the conduct 11.

The polymerization slurry is maintained in circulation in the loop reactors. The polymerization slurry is directionally circulated throughout the loop reactor 2, 3 as illustrated by the arrows 8 by one or more pumps, such as axial flow pump 6. The pump may be powered by an electric motor 7. As used herein the term "pump" includes any device from compressing driving, raising the pressure of a fluid, by means for example of a piston or set of rotating impellers 9. According to the present invention, the pump is preferably of axial type.

In a preferred embodiment, catalysts are introduced upstream from the circulation pump 6 via line 5, while diluent, monomer, potential co-monomers and reaction additives are preferably introduced downstream of the circulation pump 6 via line 11.

Each loop reactor 2, 3 is further provided with one or more settling legs 12 connected to the pipes 4 of the reactor 2, 3. Intermediate polymer slurry or polymer product may be removed from the loop reactors, by continuous or periodical discharge through one or more settling legs 10 along with some diluent. In the settling legs 12, the solid content is increased with respect to its concentration in the body of the loop reactor. As illustrated in FIG. 1, polymer slurry settled in the settling legs 12 may be removed by means of a three-way valve 15, either to another reactor 3, to which it is transferred by means of a transfer line 16, or to the product recovery zone, for instance by means of a conduit 20.

The settling legs can be located on any segment or any elbow of said loop reactor. In said settling legs the polymerization slurry decants so that the slurry exiting the reactor is more concentrated in solid than the circulating slurry. This permits to limit the quantity of diluent that has to be treated and re-fed to the reactor. It will be understood that the discharge of said settling legs may be operated in a continuous or discontinuous mode.

As illustrated in FIG. 1, one of the horizontal sections of each reactor 2, 3 is provided with four settling legs 12. Although only four settling legs are illustrated in FIG. 1, the present invention encompasses loop reactors comprising one or more settling legs. In an embodiment of the present invention said loop reactor comprises 2 to 20 settling legs, preferably 4 to 12 settling legs, more preferably 6 to 10 settling legs.

The settling legs 12 are preferably provided with an isolation valve 13. These valves 13 may for example be ball valves. Under normal conditions these valves are open. These valves can be closed for example to isolate a settling leg from operation. Said valves 13 can be closed when the reactor pressure falls below a chosen value.

Further the settling legs can be provided with product take off or discharge valves 14. Discharging is performed in such a way that the volume discharged from a settling leg substantially corresponds to the volume of polymer slurry settled in said settling leg since its previous discharge. The discharge valve 14 may be any type of valve, which can permit continuous or periodical discharge of polymer slurry, when it is fully open. An angle valve, or ball valve may be suitably used. For example, the valve may have such a structure that solid matter is prevented from accumulating or precipitating at the main body portion of the valve. However, the type and structure of the discharge valve can be selected by those skilled in the art as required. According an embodiment of the present invention the totality of settled slurry is discharged at each opening of the discharge valve. When a plurality of legs are employed, the discharge of the settled polymer slurry may be discharged in sequence on a rotating basis for more uniform discharging to a subsequent reactor or to a product recovery zone.

Downstream the valve 14, at the exit of the settling leg 12, a three-way valve 15 is provided which allows to transfer polymer slurry settled in the settling legs, either to a product recovery zone, or to another reactor, by means of the transfer line 16.

Each settling leg 10 provided on one reactor 2, which is connected in series with another reactor 3, may be provided with a transfer line 16 for transfer of (intermediate) polymer slurry settled in the settling leg 12 to the other loop reactor 3. Settling legs 12 can also be connected to the pipes of the other loop reactor 3 for discharging settled polymer slurry into a product recovery zone, e.g. by means of conduits 18. As used herein "product recovery zone" includes but is not limited to heated or not heated flash lines, flash tank, cyclones, filters and the associated vapor recovery and solids recovery systems or transfer lines to a following reactor and said following reactor when several reactors are connected in series.

The two loop reactors 2, 3 represented in FIG. 1 are connected in series by means of transfer lines 16. These transfer lines comprise generally cylindrical, inter mediate product transfer lines and extend substantially horizontally from the exit of a settling leg of a reactor to the entry in the other reactor. In particular, the transfer line connects the three-way valve 15, provided at the exit of the settling leg 12 of one reactor 2, with the entry in the other reactor 3, where a piston valve 18 is provided.

FIG. 2 is a detailed illustration of the connection of two loop reactors by means of a transfer line 16. As illustrated in FIG. 2, the transfer line extend s substantially horizontally under an inclination angle $\alpha$ with respect to a horizontal axis X-X'. In a preferred embodiment, the angle $\alpha$ is lower than 45°, preferably lower than 40°, lower than 35°, lower than 30°, lower than 25°, lower than 20°, lower than 15° and most preferably corresponds to 0°, 1°, 2°, 3°, 4°, 5°, 6°, 7°, 8°, 9° or 10°.

In another embodiment, the tangent of angle $\alpha$ can also be defined as $\Delta H/\Delta L$, whereby $\Delta L$ is the horizontal distance between the exit of a settling leg of a reactor and the entry in another reactor, and whereby $\Delta H$ is the perpendicular distance between the exit of a settling leg of a reactor, in particular the three-way valve 15, and the entry in another reactor, in particular at the piston valve 18. In a preferred embodiment, the perpendicular distance $\Delta H$ between the exit of a settling leg of a reactor and the entry in another reactor is smaller than the horizontal distance $\Delta L$ between the exit of a settling leg of a reactor and the entry in another reactor.

In another preferred embodiment, the transfer line 16 can be further provided with one or more means for controlling temperature, flow or pressure of the polymer slurry in said line. The means for controlling temperature may for instance comprise a jacket In addition, diluent flushing means 17 can be provided preferably at the inlet of the transfer line 16. Isobutane flushing means 17 enable to flush isobutane through the transfer line 17 and to keep the line unplugged. This is important when the settling leg is put out of service. One of the advantages of such flush is that a settling leg 12 can be can put back in service after it was taken out of service.

In another embodiment, the transfer line 16 for transferring polymer slurry from one to another loop reactor is e quipped by one or more valves, preferably piston valves 18 at the outlet of the transfer line. The piston valves 18 are capable of sealing the orifice by which the transfer line 16 is connected to the loop reactor 3.

It is believed that positioning of loop reactors in a multiple loop reactor system in a substantially plane and the use of the substantially horizontal intermediate product transfer lines enables to improve operating characteristics for the system by facilitating the installation of the reactors and by enabling the reactors to be installed at larger distances than is the case when using vertically arranged reactors.

Further, such substantially horizontal configuration allows easiness of locating the lines so that they are straight. Obstruction in the transfer line, including curves or any other deviations from a substantially horizontal orientation, and any unnecessary extension of the transfer line, may decrease the rate of transfer between the loop reactors and increases the frequency of plugging in the transfer line.

The polymerization system of the present invention minimizes the opportunity for plugging in the transfer lines by eliminating sites where the polyolefin polymer can begin to accumulate. Thus, in the preferred embodiment, the transfer line is substantially horizontal in orientation and free of any bends or other obstruction. If desired, additional means may be provided in the product transfer line for aiding the flow of polymer product between the loop reactors, e.g. vibration hammers.

As a further safety measure in the event of polymer plugs or obstructions developing in the transfer line during operation, more than one product transfer lines is provided between the polymerization loop reactors.

In the event that the horizontal transfer line becomes plugged or obstructed for any reason, or if a product flow rate beyond the capacity of the transfer line is desired, then polymer slurry can be withdrawn from one reactor through another transfer line and supplied to an other polymerization reactor to permit continued operation of the system. The reactors are still working while transfer lines are out of operation.

In a preferred embodiment, more than one product transfer line is not only used from safety point of view, but also from productivity point of view. More than one product transfer line may be used so that the use of settling legs is maximized and the transfer of diluent from the first reactor to the second reactor is minimized. In another embodiment, some transfer lines can be put out of service, e.g. when polymerization is performed at reduced rates and for the start-up.

Preferably, the transfer lines for transferring polymer slurry from one to another reactor, are continuously flushed, e.g. with isobutane, in operation or not.

In another preferred embodiment, by operation in accordance with the present invention, all lines, vessels, pumps, valves, etc., can be kept free of clogging by means of flushing or purging with nitrogen or diluent, i.e. isobutane. It is to be understood that where necessary flushing and purging means and lines are available on the device according to the invention in order to avoid plugging, or blocking. This is useful for example when the reactor is to be completely emptied in order to make an intervention on the reactor.

It is clear from the present description that numbers and dimensions of the different parts of the reactor relate to the size of the polymerization reactors and can be changed in function of the reactor sizes.

In another preferred embodiment, it is to be understood that all lines or conduits applied in accordance with the present invention may be provided, where necessary with flow measuring means.

In a preferred embodiment, the present invention can be applied on a double loop reactor, as depicted on FIG. 3. FIG. 3 represents two single loop reactors 100; 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, is injected in the reactor 100 or 116 by means of the conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the valve 111 at the exit of the settling leg 109 of reactor 100, a transfer line 112 is provided which allows to transfer polymer slurry settled in the settling legs 109 to the other reactor 116 preferably through a piston valve 115. Polymer slurry settled in the settling legs 109 of reactor 116 can be removed by means of one or more product recovery lines 113, e.g. to a product recovery zone.

While the invention has been described in terms of the presently preferred embodiment, reasonable variations and modifications are possible by those skilled in the art and such variations are within the scope of the described invention and the appended claims.

The invention claimed is:

1. A multi-reactor reactor system comprising:
 a first reactor, wherein the first reactor comprises a plurality of interconnected pipes defining a flow path for a polymer slurry, wherein an isolation valve is affixed to one of the plurality of interconnected pipes and a settling leg, wherein the settling leg is affixed to the isolation valve and the settling leg having an outlet end;
 a second reactor, wherein the second reactor comprises a plurality of interconnected pipes defining a flow path for a polymer slurry, wherein an entry valve is affixed to one of the plurality of interconnected pipes, the entry valve having an entry valve inlet end; and
 a transfer line having a transfer line inlet end and a transfer line outlet end, wherein the transfer line inlet end is affixed to the settling line outlet end and the transfer line outlet end is affixed to the entry valve and further the transfer line which is predominantly horizontal in that it is at an angle of inclination from the horizontal which is less than 45 degrees.

2. The multi-reactor system of claim 1, wherein the angle of inclination from the horizontal of the transfer line is less than 15 degrees.

3. The multi-reactor system of claim 2, wherein the inclination from the horizontal of the transfer line is less than 5 degrees.

4. The multi-reactor system of claim 3, wherein the inclination from the horizontal of the transfer line is approximately 0 degrees.

5. The multi-reactor system of claim 1, wherein the perpendicular distance between the settling leg outlet end and the entry valve inlet end is smaller than the horizontal distance between the settling leg outlet end and the entry valve inlet end.

6. The multi-reactor system of claim 1 wherein the first and second reactors are loop reactors.

7. The multi-reactor system of claim 1 wherein both the first and second reactors each further comprise an axial flow pump.

8. The multi-reactor system of claim 1 wherein the transfer line inlet end is affixed to the settling line outlet end by means of a three-way valve.

9. The multi-reactor system of claim 1 wherein the isolation valve is a ball valve.

* * * * *

UNITED STATES PATENT AND TRADEMARK OFFICE
CERTIFICATE OF CORRECTION

PATENT NO.         : 8,252,240 B2
APPLICATION NO.    : 13/331855
DATED              : August 28, 2012
INVENTOR(S)        : Hugo Vandaele Page 1 of 1

It is certified that error appears in the above-identified patent and that said Letters Patent is hereby corrected as shown below:

On the first page of the Patent:

Related U.S. Application Data

(63)    Continuation of application No. 11/498,336, filed on Aug. 1, 2006, now abandoned, which is a continuation-in-part of application No. PCT/EP2005/050626, filed on Feb. 13, 2005.

Should read:

"(63)    Continuation of application No. 11/498,336, filed on Aug. 1, 2006, now abandoned, which is a US National Stage under 35 USC 371 of Patent Cooperation Treaty (PCT) International Application No. PCT/EP2005/050626 having an International Filing Date of February 13, 2005."

Signed and Sealed this
Thirteenth Day of November, 2012

David J. Kappos
*Director of the United States Patent and Trademark Office*